United States Patent
Narita et al.

(10) Patent No.: US 10,291,808 B2
(45) Date of Patent: May 14, 2019

(54) SCANNING SYSTEM DETERMINING EACH OF A PLURALITY OF IMAGE PROCESSES TO BE PERFORMED ON SCAN DATA

(71) Applicant: Brother Kogyo Kabushiki Kaisha, Nagoya-shi, Aichi-ken (JP)

(72) Inventors: Kenju Narita, Nagoya (JP); Hiroya Nojiri, Nagoya (JP); Kenji Tamaki, Ichinomiya (JP); Akidi Yoshida, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/111,354

(22) Filed: Aug. 24, 2018

(65) Prior Publication Data
US 2019/0068820 A1    Feb. 28, 2019

(30) Foreign Application Priority Data
Aug. 31, 2017 (JP) ................................. 2017-167123

(51) Int. Cl.
*H04N 1/60* (2006.01)
*H04N 1/00* (2006.01)

(52) U.S. Cl.
CPC ..... *H04N 1/00912* (2013.01); *H04N 1/00482* (2013.01); *H04N 1/00708* (2013.01); *H04N 1/00726* (2013.01); *H04N 1/00734* (2013.01)

(58) Field of Classification Search
None
See application file for complete search history.

(56) References Cited

U.S. PATENT DOCUMENTS

| | | | | |
|---|---|---|---|---|
| 6,628,416 B1* | 9/2003 | Hsu | ................... | H04N 1/00204 358/1.15 |
| 8,482,773 B2* | 7/2013 | Shibao | ............... | H04N 1/00204 358/1.1 |
| 8,767,273 B2* | 7/2014 | Kanaya | ............. | H04N 1/00411 358/474 |
| 2013/0265606 A1* | 10/2013 | Tsuya | ................... | H04N 1/0035 358/1.15 |
| 2014/0071505 A1* | 3/2014 | Jittou | ................... | H04N 1/6027 358/519 |
| 2015/0092210 A1* | 4/2015 | Tsugimura | ............... | H04N 1/41 358/1.13 |

FOREIGN PATENT DOCUMENTS

JP    2015-226179 A    12/2015

* cited by examiner

*Primary Examiner* — Dung D Tran
(74) *Attorney, Agent, or Firm* — Banner & Witcoff, Ltd.

(57) ABSTRACT

A scanning system includes a scanner, an information processing apparatus, and a processor. The processor receives an input via a user interface and determines each of a plurality of image processes to be performed on scan data. In a case where first and second image processes are determined to be performed, the processor instructs the scanner to output the scan data to the information processing apparatus, and instructs the information processing apparatus to perform the first and second image processes. In a case where the first image process is determined not to be performed and the second image process is to be determined to be, the processor instructs the scanner to perform the second image process on the scan data to generate information, and instructs the scanner to output the generated information to the information processing apparatus.

12 Claims, 9 Drawing Sheets

SCANNING SYSTEM DETERMINING EACH OF A PLURALITY OF IMAGE PROCESSES TO BE PERFORMED ON SCAN DATA

CROSS REFERENCE TO RELATED APPLICATION

This application claims priority from Japanese Patent Application No. 2017-167123 filed Aug. 31, 2017. The entire content of the priority application is incorporated herein by reference.

TECHNICAL FIELD

The present disclosure relates to a scanning system or the like provided with a scanner that generates scan data by optically reading an original, and an information processing apparatus that receives scan data generated by the scanner.

BACKGROUND

A scanner that generates scan data by optically reading an original is known. The scanner can perform a process for automatically detecting the size of the original to be read.

SUMMARY

However, in some cases it is preferable for the scanner to execute image processes, such as the process for automatically detecting the original size, and in some cases it is preferable for the information processing apparatus to execute these image processes. Therefore, it is an object of the present disclosure to provide a scanning system that includes a scanner and an information processing apparatus and that is capable of executing image processes suitably.

In order to attain the above and other objects, the disclosure provides a scanning system. The scanning system includes a scanner, an information processing apparatus, a user interface, and a processor. The scanner is configured to generate scan data based on an original through an optical reading. The processor configured to perform: receiving an input via the user interface; determining, on the basis of the input, each of a plurality of image processes to be performed on the scan data or data based on the scan data, the plurality of image processes including a first image process and a second image process; in a first case where both the first image process and the second image process are determined to be performed, instructing the scanner to output the scan data to the information processing apparatus, and instructing the information processing apparatus to perform both the first image process and the second image process; and in a second case where the first image process is determined not to be performed and the second image process is determined to be performed, instructing the scanner to perform the second image process on the scan data to generate information, and instructing the scanner to output the generated information to the information processing apparatus.

According to another aspect, the disclosure provides an information processing apparatus. The information processing apparatus includes a communication interface, a user interface, and a processor. The communication interface is configured to communicate with a scanner. The processor is configured to perform: receiving an input via the user interface; determining, on the basis of the input, each of a plurality of image processes to be performed on the scan data or data based on the scan data, the plurality of image processes including a first image process and a second image process; in a first case where both the first image process and the second image process are determined to be performed, instructing the scanner to output the scan data to the information processing apparatus, and instructing the information processing apparatus to perform both the first image process and the second image process; and in a second case where the first image process is determined not to be performed and the second image process is determined to be performed, instructing the scanner to perform the second image process on the scan data to generate information, and instructing the scanner to output the generated information to the information processing apparatus.

According to still another aspect, the disclosure provides a non-transitory computer readable storage medium storing a scanner driver having a set of program instructions installed on and executed by a processor of an information processing apparatus for controlling a scanner, the information processing apparatus having a communication interface configured to communicate with the scanner, a user interface and the processor, the set of program instructions, when executed by the processor, causes the information processing apparatus to perform: receiving an input via the user interface; determining, on the basis of the input, each of a plurality of image processes to be performed on the scan data or data based on the scan data, the plurality of image processes including a first image process and a second image process; in a first case where both the first image process and the second image process are determined to be performed, instructing the scanner to output the scan data to the information processing apparatus, and instructing the information processing apparatus to perform both the first image process and the second image process; and in a second case where the first image process is determined not to be performed and the second image process is determined to be performed, instructing the scanner to perform the second image process on the scan data to generate information, and instructing the scanner to output the generated information to the information processing apparatus.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Structure of a Scanning System

Figure 1:
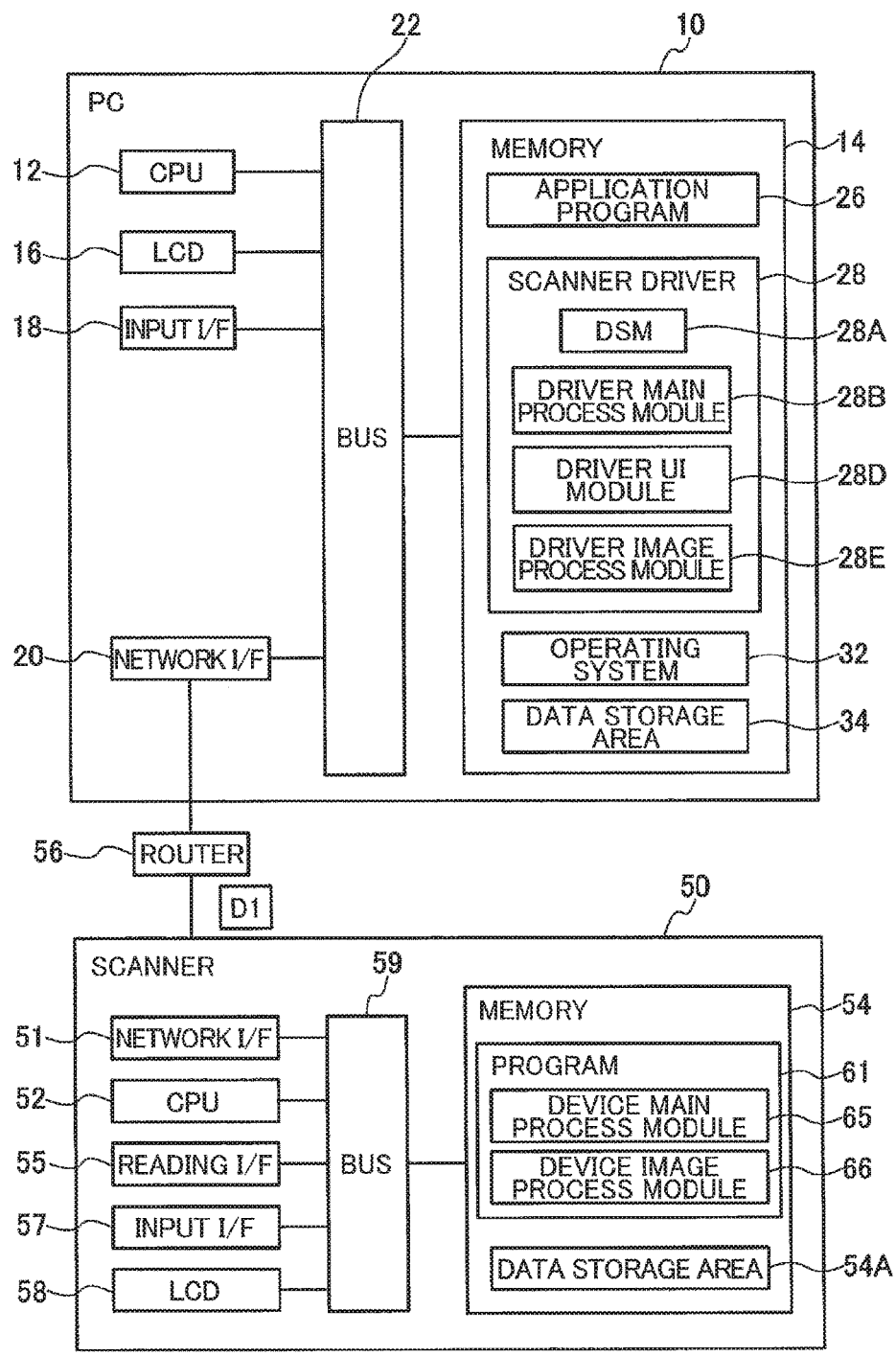
FIG. 1 is a block diagram of a scanning system according to an embodiment.

FIG. 1 is a block diagram of a scanning system 1 according to an embodiment of the present disclosure. The scanning system 1 includes a personal computer (PC) 10 (an example of the information processing apparatus), a scanner 50, and a router 56.

The PC 10 primarily includes a CPU 12 (an example of the computer and the controller), a memory 14, a liquid crystal display (LCD) 16 (an example of the user interface), an input interface 18 (an example of the user interface), and a network interface 20 (an example of the communication interface). All components in the PC 10 are interconnected and capable of communicating with each other via a bus 22. Note that "interface" is also abbreviated as "I/F" in the drawings.

The CPU 12 executes processes according to an application program 26, a scanner driver 28 (an example of the control program), and an operating system (hereinafter abbreviated as "OS") 32 stored in the memory 14. The application program 26 is capable of executing a character recognition process implemented with a well-known optical character recognition technology on scan data D1 for an image scanned by the scanner 50, for example. More specifically, the application program 26 is image-editing software such as Adobe Photoshop (registered trademark).

The scanner driver 28 is the device driver for the scanner 50 that controls operations of the same. The scanner driver 28 has a data source manager (DSM) 28A, a driver main process module 28B, a driver user interface module 28D, and a driver image process module 28E. The DSM 28A is a program in the scanner driver 28 that functions as an interface for receiving data from the application program 26 and transmitting data to the application program 26. The scanner driver 28 performs inputting and outputting operations in conformance with the TWAIN communications protocol. Note that the above configuration of the scanner driver 28 is merely an example and may be modified to suit the type of scanner driver 28 and the like. For example, when the scanner driver 28 performs communications based on a protocol other than TWAIN, such as Windows image acquisition protocol, the scanner driver 28 need not be provided with the DSM 28A. In this case, the OS 32 may implement the processes that will be performed by the DSM 28A in the following description.

The driver main process module 28B, the driver user interface module 28D, and the driver image process module 28E execute various processes as modules included in the scanner driver 28. The driver main process module 28B exchanges data with the scanner 50 and issues commands to the scanner 50. The driver user interface module 28D displays configuration screens and the like. The driver image process module 28E executes image processes on the scan data D1.

The OS 32 is a program that provides basic functions used by the application program 26 and the scanner driver 28. In the following description, the action of the CPU 12 executing the application program 26 and the like may be simply referred to by the program name. For example, the phrase "the application program 26" may be used to signify "the CPU 12 executing the application program 26."

The memory 14 is also provided with a data storage area 34 (an example of the storage area). The data storage area 34 serves to store data and the like required when executing the application program 26 and the like. Note that the memory 14 is configured of a combination of storage memory that includes a random access memory (RAM), a read-only memory (ROM), a flash memory, a hard disk drive (HDD), and a buffer provided in the CPU 12.

The memory 14 may be any computer-readable storage medium. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The LCD 16 displays various functions of the PC 10. The input interface 18 is an interface that enables the user to input operations and includes a keyboard, a mouse, and the like. The network interface 20 is connected to a network interface 51 of the scanner 50 via the router 56. This connection enables the PC 10 and the scanner 50 to exchange information.

The scanner 50 is a device that reads an image printed on an original and generates scan data D1 representing this image. In addition to the network interface 51 mentioned above, the scanner 50 is provided with a CPU 52, a memory 54, a reading interface 55, an input interface 57, and an LCD 58. All of the components in the scanner 50 are interconnected and capable of communicating with each other via a bus 59.

The CPU 52 executes processes according to a program 61 stored in the memory 54. The memory 54 is configured of a combination of RAM, ROM, and the like. The memory 54 is also provided with a data storage area 54A. The data storage area 54A serves to store data and the like required when executing the program 61.

The program 61 performs overall control of the scanner 50. The program 61 has a device main process module 65, and a device image process module 66. The scanner 50 is controlled by the CPU 12 (the PC 10) to transmit scan data D1 to the PC 10. The CPU 52 executes a generation process for generating the scan data D1 and image processes for processing the scan data D1 according to the device main process module 65 and the device image process module 66. The device main process module 65 and the device image process module 66 will be described later in greater detail.

The reading interface 55 is a charge-coupled device (CCD), a contact image sensor (CIS), or another device for optically reading images. The input interface 57 allows the user to input operations and includes a liquid crystal display and various switches and the like. The LCD 58 displays various functions of the scanner 50.

Operational Sequence for Reading an Image

Figure 2:
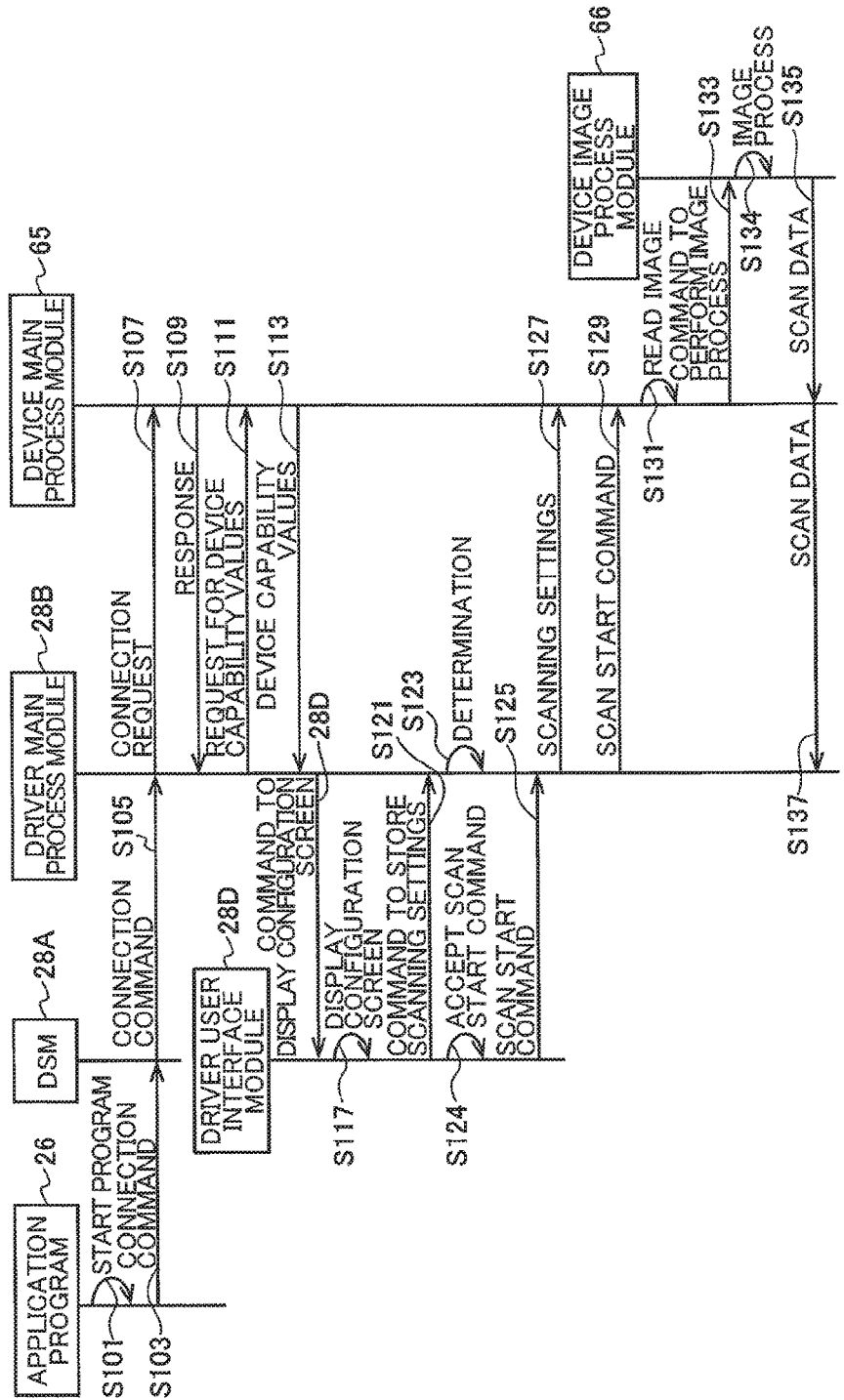
FIG. 2 is a sequence diagram illustrating operations for reading an image.
Figure 3:
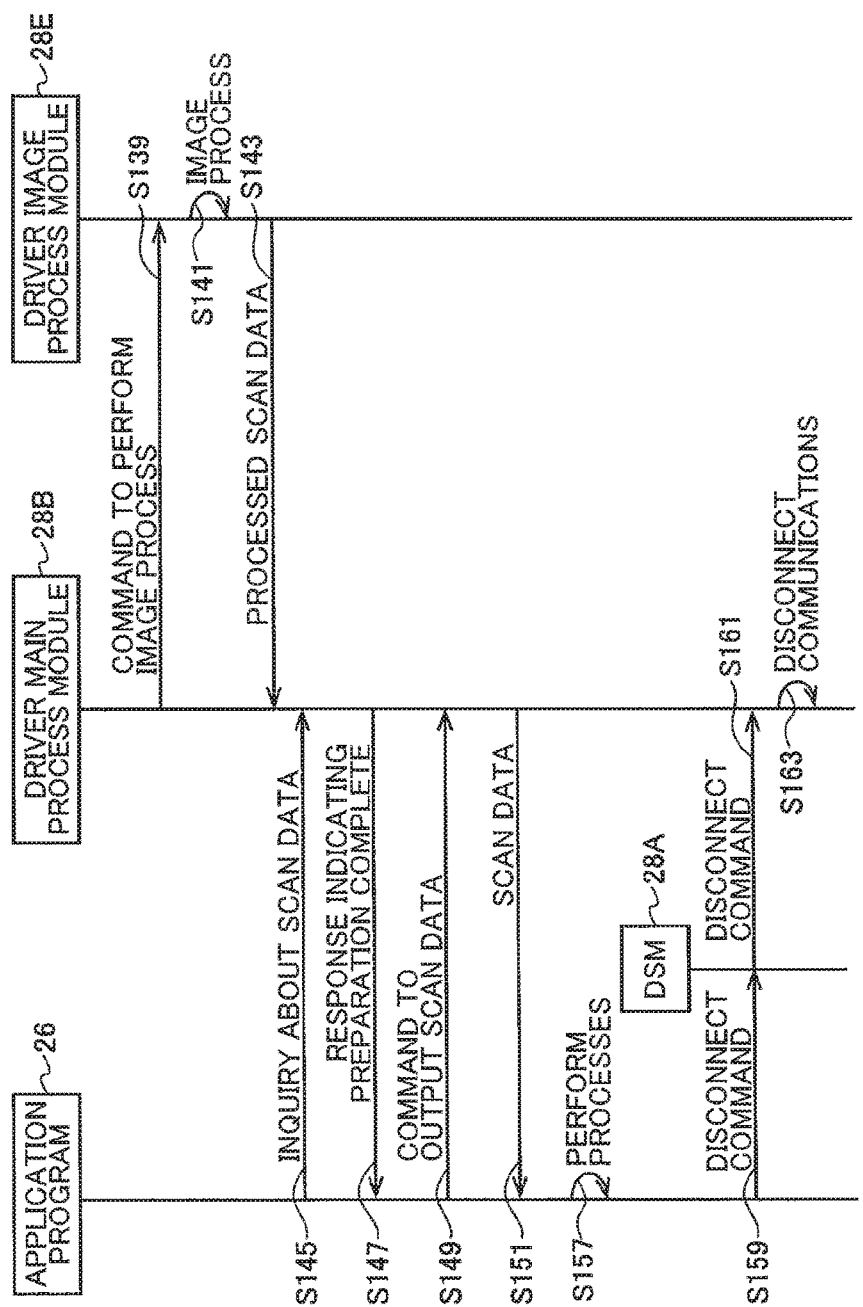
FIG. 3 is a sequence diagram illustrating operations for reading an image performed subsequent to operations shown in FIG. 2.

Next, the sequence of operations performed on the scanning system 1 when the user operates the PC 10 and the scanner 50 reads an image will be described. FIGS. 2 and 3 show an example of the operational sequence for reading an image.

In general, the sequence charts in this specification depict steps performed by the CPUs 12 and 52 according to instructions described in programs. In other words, actions such as "determine," "extract," "select," "calculate," "set,"

"identify," "acquire," "receive," "control," and "configure" in the following description represent steps performed by the CPU 12 or the CPU 52. Steps performed by the CPU 12 include processes that control hardware through the OS 32. Note that the concept of "acquire" in this specification does not necessarily require a request. In other words, a process in which the CPU 12 receives data without requesting such data includes the concept of the CPU 12 acquiring data. Further, "data" in this specification represents bit strings that a computer can read. Data of different formats are treated as the same data when the content of the data is essentially the same. The same holds true for "information" in the specification. Further, processes such as "command," "response" and "request" are performed by communicating information specifying the "command," "response," and "request". Further, the terminology "command," "response," and "request" may signify the information specifying the command, the response, and the request, respectively.

In S101 of FIG. 2, the application program 26 is started in response to an operation inputted through the input interface 18 of the PC 10. In S103 and S105 the application program 26 issues a command via the DSM 28A of the scanner driver 28 to the driver main process module 28B to establish a connection with the scanner 50. In S107 the driver main process module 28B transmits a connection request to the scanner 50 via the router 56.

In response to receiving the connection request from the driver main process module 28B of the PC 10, in S109 the device main process module 65 of the scanner 50 transmits a response for establishing a connection. Through this process, communication is established between the PC 10 and the scanner 50. After establishing communication with the device main process module 65, in S111 the driver main process module 28B transmits a request for device capability values to the device main process module 65.

In this example, the device capability values denotes values specifying each of the plurality of image processes that can be executed on the scanner 50, such as capability information related to the size of an original. The capability information related to the original size includes information on the maximum size of an original that the scanner 50 can read, and information indicating whether the scanner 50 can execute an original detection process. The original detection process is for automatically detecting the size of the original without user input specifying the size of the original to be read and is an example of the first image process in the present disclosure.

The device capability values may include values related to the color scales of scan data that the scanner 50 can generate. A color scale is a value specifying the number of colors that can be set for one pixel in bitmap image data and may include the 24-bit (166,777,216 colors) color scale (an example of the first color depths) capable of representing chromatic colors, the 8-bit (256 colors) grayscale (an example of the third color depths) capable of representing achromatic color only, and the 1-bit (two colors: white and black) monochrome scale (an example of the second color depths). Color scale is also referred to as color depth. In other words, the color scale indicates the color space of the scan data and total gradation levels of each component of the color space. Capability values for color scale may include information specifying what values can be set for a parameter indicating the color scale of scan data to be generated by the scanner 50, information specifying whether the scanner 50 can execute a scale detection process, and information specifying whether the scanner 50 can execute a process for automatically determining a suitable color scale for the detected number of colors and information specifying whether the scanner 50 can execute a process for converting the scan data to data represented by the suitable color scale. Here, the scale detection process is for automatically detecting the number of colors included in a scanned original and is an example of the second image process.

The device capability values may also include capability information related to a process for detecting a blank original. In some cases, the original being read is a blank sheet, i.e., a blank original. The capability information related to a process for detecting blank originals may include information specifying that the scanner 50 can execute a blank sheet detection process. The blank sheet detection process is for detecting whether the scan data generated by reading an original includes scan data of a blank original, and is an example of the second image process. The scanner 50 of the embodiment can execute each of the original detection process, the scale detection process, the scale conversion process, and the blank sheet detection process. Further, in the embodiment, the PC 10 (the scanner driver 28) can also execute each of the original detection process, the scale detection process, the scale conversion process, and the blank sheet detection process.

In response to receiving the request for device capability values from the scanner driver 28, in S113 the device main process module 65 transmits values specifying its own device capability values. In response to receiving the device capability values from the device main process module 65, in S115 the driver main process module 28B issues a command to the driver user interface module 28D of the scanner driver 28 to display a configuration screen. The configuration screen is displayed on the basis of the device capability values transmitted from the device main process module 65 and can be used for accepting settings for processes related to image reading that are available on the scanner 50 or the scanner driver 28.

Specifically, the driver user interface module 28D displays the configuration screen based on the capability values for the original size in order to accept from the operation by the user to set a parameter to a setting value indicating whether to execute the original detection process and a parameter to a setting value specifying the original size. The driver user interface module 28D also displays a configuration screen on the basis of the capability values for color scale in order to accept operation by the user to set a parameter to a setting value indicating whether to execute the scale detection process and a parameter to a setting value specifying the color scale. The driver user interface module 28D also displays a configuration screen based on the capability values for a process to detect a blank original in order to accept operation by the user to set a parameter to a setting value indicating whether to execute a blank sheet detection process. All of the above-described settings may be made via one configuration screen.

In S117 the driver user interface module 28D displays each configuration screen on the LCD 16 of the PC 10 according to the commands received from the driver main process module 28B. When an OK button in the configuration screen is operated, the driver user interface module 28D stores in the memory 14 all values set for scanning parameters used in image reading (an example of the accepting). Specifically, the stored values are set through operations by the user on the input interface 18 up until the OK button is operated. Hereinafter, these values may be called "scanning settings" or "scanning setting values" for the scanning parameters and an example of the setting values. Here, the action of the CPU 12 storing settings in the memory 14 based on user operations may also be called "accepting settings" or "configuring settings." The operation of pressing a button in the configuration screen displayed on the LCD 16 is an example of a setting operation. The scanning settings may be setting values that are directly specified through user operations. For example, a setting specifying the resolution "600 dpi" may be stored in the memory 14 in response to a setting operation specifying "600 dpi." The scanning settings may also be settings specified indirectly through setting operations. For example, a setting value for the resolution "600 dpi" may be stored in the memory 14 in response to a setting operation specifying "high quality." The method of accepting scanning settings is not limited to a method using a user interface displayed on the LCD 16, but may be a method of reading a configuration file storing a description of scanning settings, for example.

The scanning settings include setting values related to the original size (an example of a setting value), such as a setting value indicating whether to execute the original detection process (an example of a setting value) and a setting value specifying the size of the original set through a user operation. The scanning settings further include setting values related to color scale, such as a setting value indicating whether to execute the scale detection process and a setting value indicating the color scale set through a user operation. The scanning settings also include setting values related to the process for detecting a blank original (an example of a setting value) such as a setting value indicating whether to execute the blank sheet detection process.

After the settings have been received, in S121 the driver user interface module 28D outputs the scanning settings to the driver main process module 28B and issues a command to the driver main process module 28B to store the scanning settings. The driver main process module 28B stores the scanning settings received from the driver user interface module 28D in the data storage area 34 of the memory 14, for example.

In response to receiving scanning settings from the driver user interface module 28D, in S123 the driver main process module 28B determines, on the basis of these setting values, which of the PC 10 and the scanner 50 will execute each of the original detection process, the scale detection process, and the blank sheet detection process if setting values indicates executions of these processes. The determination in S123 will be described later in greater detail.

In S124 the driver user interface module 28D accepts a scan start command from the user. For example, if the user performs an operation in the configuration screen displayed in S117 described above to initiate a scan, in S124 the driver user interface module 28D receives this operation, and in S125 outputs a scan start command to the driver main process module 28B.

In response to receiving the scan start command from the driver user interface module 28D, in S127 the driver main process module 28B first transmits to the device main process module 65 the scanning settings that were stored in S121 described above, i.e., the scanning settings received by the user through the configuration screen. Here, settings related to the image process(es) determined to be executed on the scanner 50 in S123 are transmitted to the device main process module 65 among the scanning settings received from the user. The driver main module 28B may modify the scanning settings which is received by the user so as to be in accordance with the determination results in S123 and transmits the modified setting value as described later in detail. For example, in a case where the setting value indicates the monochrome scale specified by the user and the setting value indicates execution of the original detection process, the driver main module 28B modifies the setting value indicating the monochrome scale to the grayscale.

In S129 the driver main process module 28B transmits the scan start command to the device main process module 65. In response to receiving the scan start command from the driver main process module 28B, in S131 the device main process module 65 executes a process for driving the reading interface 55 to optically read on image from an original. Through this optical reading, the device main process module 65 generates scan data D1 (an example of the first scan data).

The device main process module 65 generates the scan data D1 based on data outputted from the reading interface 55. In S133 the device main process module 65 issues a command to the device image process module 66 to perform the image process(es) on the scan data D1 on the basis of determination result in S123. In S133 the device main process module 65 also outputs the scan data D1 and the scanning settings received in S127 to the device image process module 66 together with the command to perform the image process(es). In S134 the device image process module 66 executes the image process(es) on the scan data D1 based on the scanning settings received from the device main process module 65. In S135 the device image process module 66 outputs the scan data D1 processed in S134 to the device main process module 65.

In S137 the device main process module 65 transmits to the driver main process module 28B the scan data D1 received from the device image process module 66. In this process, the device main process module 65 may receive one line worth of the scan data D1 from the device image process module 66 at a time and may transmit the received line worth of scan data D1 to the driver main process module 28B, for example. In other words, the device main process module 65 transmits the one line worth of scan data each time the device image process module 66 has completed the image process(es) for one line. However, the device main process module 65 is not limited to a configuration for transmitting the scan data D1 line-by-line. For example, the device main process module 65 may transmit a plurality of lines worth of scan data for which the image process(es) has (have) been completed.

The device main process module 65 may also perform a process to compress the scan data D1 before transmitting the scan data D1 to the driver main process module 28B in order to reduce the data volume. In this case, the driver main process module 28B decompresses the compressed scan data D1 received from the device main process module 65 and uses the decompressed scan data D1 in subsequent processes.

In S137, the driver main process module 28B stores the received scan data D1 in the memory 14. In S139 of FIG. 3, the driver main process module 28B issues a command based on the determination result in S123 to the driver image process module 28E, which is a module belonging to the scanner driver 28, to perform one or more image process on the scan data D1. Further, in S139 the driver main process module 28B also transmits the scan data D1 received from the device main process module 65 in S137 of FIG. 2 to the driver image process module 28E together with the command to perform the image process(es). In S139 the driver main process module 28B also outputs the scanning settings stored in S121 of FIG. 2 to the driver image process module 28E. Here, settings related to the image process(es) determined in S123 to be performed on the PC 10 are outputted to the driver image process module 28E among the scanning settings received via the setting screen from the user in S121.

In S141 the driver image process module 28E performs the image process(es) on the scan data D1 based on the scanning settings received from the driver main process module 28B. In S143 the driver image process module 28E outputs the scan data D1 on which the image process(es) is (are) performed in S141 (hereinafter referred to as the processed scan data D1) to the driver main process module 28B.

After outputting the command to establish a connection with the scanner 50 to the driver main process module 28B in S103 shown in FIG. 2, in S145 the application program 26 issues periodic inquiries regarding whether the processed scan data D1 exists to the driver main process module 28B. Specifically, the application program 26 begins issuing periodic queries about the processed scan data D1 to the driver main process module 28B. Specifically, in S145 the application program 26 periodically queries the driver main process module 28B regarding whether the processed scan data D1 received from the scanner 50 is ready to transfer. The application program 26 may also be configured to wait until the processed scan data D1 is transmitted from the driver main process module 28B without issuing periodic inquiries to the driver main process module 28B.

In S147 the application program 26 receives a response from the driver main process module 28B to the query issued in S145. In response to receiving this response, in S149 the application program 26 issues a command to the driver main process module 28B to output the processed scan data D1. In response to receiving the command from the application program 26 to output the processed scan data D1, in S151 the driver main process module 28B outputs the processed scan data D1 to the application program 26.

In S157 the application program 26 executes a prescribed process on the processed scan data D1 received from the driver main process module 28B. Here, the prescribed process is a process requested by the user, such as a process to print the processed scan data D1. As alternatives, the application program 26 may execute a process to store the processed scan data D1 on the PC 10 (in the memory 14), a process to display the processed scan data D1 on the LCD 16, one or more image processes for the processed scan data D1, a process to transfer the processed scan data D1 to another application program, and/or a process to transfer the processed scan data D1 to a server.

After completing the process in S157, in S159 the application program 26 outputs a disconnect command to the DSM 28A, and in S161 the DSM 28A relays the disconnect command to the driver main process module 28B. Here, the application program 26 issues the disconnect command to the driver main process module 28B via the DSM 28A to disconnect communications with the device main process module 65 (scanner 50). In S163 the driver main process module 28B disconnects communications with the device main process module 65 in response to the disconnect command received from the application program 26. This completes the process of reading an image with the scanner 50 under the control of the application program 26 and the scanner driver 28 on the PC 10.

Image Reading Process

As described above, the scanning system 1 executes image processes such as the original detection process on the scan data D1 generated by the scanner 50. In conventional methods, this original detection process for the scan data D1 would be executed on the scanner 50. However, the scanner 50 may not be able to detect the original size accurately in the original detection process.

More specifically, the scanner 50 detects the length of the original in the main scanning direction (the width of the original) based on image data generated by the reading interface 55, for example. The scanner 50 also detects the length of the original in the subscanning direction (the height of the original) based on a physical paper sensor, for example. The length of the original in the main scanning direction is also called the width of the original, and the length of the original in the subscanning direction is also called the height of the original. Here, the physical paper sensor may be a roller-type sensor, for example, that rotates while moving over the original in the subscanning direction during image reading and detects the height of the original based on level differences at the edges of the original. When detecting the original size with this type of paper sensor, error of a few millimeters may be introduced, depending on the detection precision of the sensor. Thus, when executing the original detection process, the scanner 50 may be unable to detect the original size accurately.

Therefore, on the scanning system 1 according to the embodiment, the PC 10 performs the original detection process when the scanning settings described above include a setting value specifying execution of the original detection process. In this case, the scanner 50 generates an image larger than the size of the original being scanned as the scan data, and the PC 10 performs a process to detect the size of the original on the basis of this scan data and to crop (or clip) an image of the original from the image based on the scan data.

Figure 4:
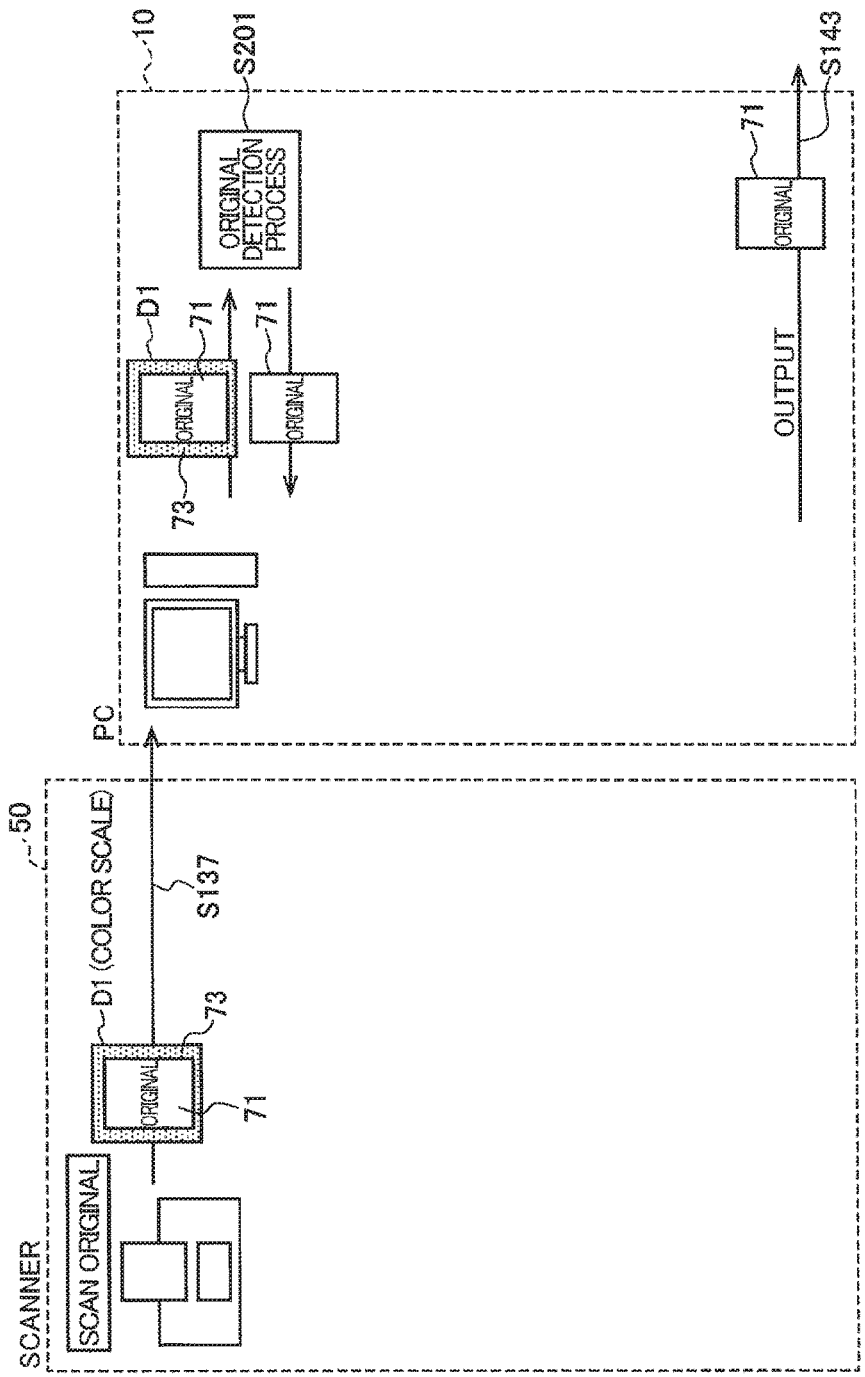
FIG. 4 is an explanation diagram illustrating processes of the scanning system when a PC executes an original detection process.

Next, an example in which the PC 10 executes the original detection process will be described while referring to the schematic diagram in FIG. 4. In the following description, it will be assumed that the largest original the scanner 50 can read is an A4-size original, while the size of the actual original being read in this example will be the postcard size. In this case, the scanner 50 reads the original of postcard size, which is smaller than the A4 size, as an A4-size original, i.e., the maximum size that the scanner 50 can read.

First, the scanner 50 reads an image of the postcard-size original as an A4-size original. Through this process, the device main process module 65 (see FIG. 2) of the scanner 50 generates A4-size scan data D1 that includes image data generated by scanning the original (hereinafter called the original image data 71), and image data generated by reading the area outside the outer edges of the original (hereinafter called the outer image data 73). At this time, the device main process module 65 essentially generates the scan data D1 at the color scale that can have the largest number of colors which is the 24-bit color scale in this case. By using this color scale, the colors of the outer image data 73 are more easily detected in the original detection process described later. Additionally, a suitable color scale can be accurately detected in the scale detection process described later.

In order to control the device main process module 65 of the scanner 50 to generate color scan data D1 that includes the original image data 71 and the outer image data 73, the driver main process module 28B of the PC 10 transmits instructions to the device main process module 65 along with the scan start command in S129 of FIG. 2 instructing the reading interface 55 to read an A4-size image in 24-bit color scale. In a case where the setting value indicates the original detection process to be performed, the driver main module 28B determines that the PC 10 performs the original detection process in S123, and thus the driver main process module 28B does not transmit to the device main process module 65 instructions instructing execution of the original detection process because the original detection process is to be executed on the PC 10.

In response to receiving the scan start command from the driver main process module 28B, the device main process module 65 executes a reading operation for an A4-size original. The outer image data 73 corresponds to the area in the A4-size image data that does not fit inside the postcard size. For example, the outer image data 73 is image data obtained by reading the scanner's cover that presses the back surface of the original against the original platen at which the scanner 50 reads the original. Hence, if the inside (side facing the original) of the scanner's cover has a gray tone, the scanner 50 reads the background color of the original, i.e., the gray color of the scanner's cover, as the outer image data 73 that surrounds the original image data 71 and adds the outer image data 73 to the periphery of the original image data 71.

Next, the scanner 50 transmits the scan data D1 including the outer image data 73 added to the original image data 71 to the PC 10. This transmission process corresponds to S137 of FIG. 2. On the PC 10, the driver image process module 28E performs the original detection process on the scan data D1 (S141 and S201).

In the original detection process, the driver image process module 28E of the PC 10 first processes the image of the scan data D1 on the basis of the specific color (gray, for example), which the outer image data 73 is estimated to have, to detect the outer image data 73 included in the scan data D1. Here, the device main process module 65 may transmit the specific color of the outer image data 73 to the driver main process module 28B in the process for acquiring capability values for the scanner 50 (S111 and S113 of FIG. 2), for example. The driver image process module 28E detects image areas in the peripheral portion of the image based on the scan data D1 that correspond to the specific color of the outer image data 73 acquired in this acquisition process as the image of the outer image data 73, for example.

More specifically, the driver image process module 28E detects the specific color of the outer image data 73 (gray in this example) located in the peripheral portions of the image based on the scan data D1 and identifies the inside edge of the detected gray color. When the inside edge forms a continuous rectangular shape, the driver image process module 28E detects the image outside of this inside edge as the image of the outer image data 73. However, if a gray color is present in the outer edge of the image corresponding to the original image data 71, the inside edge of the gray colored image corresponding to the outer image data 73 may not form a continuous rectangular shape. In such cases, the inside edge of the image corresponding to the outer image data 73 is inferred to be a continuous rectangular shape based on the gray color that extends linearly along the identified inside edge. In this way, the driver image process module 28E can identify the image for the outer image data 73 accurately.

Next, the driver image process module 28E extracts the original image data 71 by deleting the detected outer image data 73 from the scan data D1. The image process for extracting image data may be called a clipping image process. The size of the image based on this extracted original image data 71 is the image size of the original targeted for reading. Next, the driver image process module 28E outputs the extracted original image data 71. This output process corresponds to the process of S143 in FIG. 3 described above. Hence, in S143 the driver image process module 28E transmits the image data generated through the original detection process (an example of the first image data), i.e., the original image data 71 at the original size, to the driver main process module 28B.

Through this process, the PC 10 detects the outer image data 73 included in the scan data D1 and extracts the original image data 71 by removing this outer image data 73 from the scan data D1. In this way, the PC 10 can suitably detect the size of the original and can generate image data corresponding to this original size. Note that in the determination process of S123 shown in FIG. 2, the driver main process module 28B of the PC 10 determines that the PC 10 will execute the original detection process when the scanning setting values include a setting value specifying execution of the original detection process.

The blank sheet detection process is performed to detect whether the original read by the scanner 50 is a blank sheet. In this process, the original read by the scanner 50 is determined to be a blank sheet when the scan data D includes only one color of white. Consequently, in a case where the original detection process is executed on the PC 10, that is, a case where the scanner 50 generates the scan data D1 by adding the outer image data 73 to the original image data 71, the blank sheet detection process cannot be executed properly on the scanner 50. That is, even if the original image data 71 represents or is based on a blank sheet (white), in a case where gray colored outer image data 73 is added to the original image data 71, the scan data D1 will include two colors: white (the original image data 71) and gray (the outer image data 73). Since the scan data D1 includes the gray color in this case, the original image data 71 cannot be reliably detected as a blank sheet in the blank sheet detection process.

Further, the scale detection process is performed to detect the number of colors included in the original read by the scanner 50 and to detect the color scale automatically on the basis of this number of colors. Hence, the scale detection process serves to detect the number of colors in the scan data and to identify the suitable color scale based on this number of colors. Consequently, in a case where the original detection process is executed on the PC 10, that is, a case where the scanner 50 generates the scan data D1 by adding the outer image data 73 to the original image data 71, the scale detection process cannot be executed properly on the scanner 50. That is, when the gray colored outer image data 73 is added to the original image data 71, for example, the gray color in the outer image data 73 is counted as a color included in the original (the original image data 71). Thus, the number of colors in the original cannot be detected accurately.

Accordingly, when it is determined that the original detection process is to be executed on the basis of the setting values, the blank sheet detection process and the scale detection process are also determined to be executed on the PC 10 provided that the setting values specifies executions of the blank sheet detection process and the scale detection process. It is preferable that the blank sheet detection process and the scale detection process not be performed on scan data D1 that includes outer image data 73 added to the original image data 71, as described above. Thus, the blank sheet detection process and the scale detection process are executed on the image data generated from the original detection process. Hence, the blank sheet detection process and the scale detection process are executed on the PC 10 after the original detection process is executed. That is, in a case where the setting values indicates executions of the original detection process, the blank sheet detection process, and the scale detection process, the driver main process module 28B of the PC 10 determines that PC 10 will execute the original detection process, the blank sheet detection process, and the scale detection process, and that the scanner 50 will generate the A4-size scan data D1 in the 24-bit color scale for the original detection process. The driver main process module 28B transmits instructions to the device main process module 65 along with the scan start command in S129 instructing the reading interface 55 to read an A4-size image in 24-bit color scale. In this case, the driver main process module 28B transmit to the device main process module 65 none of instructions instructing execution of the original detection process, instructions instructing execution of the blank sheet detection process, the instructions instructing execution of the scale detection process, and the instructions execution of the scale conversion process because these detection processes are to be executed on the PC 10.

Figure 5:
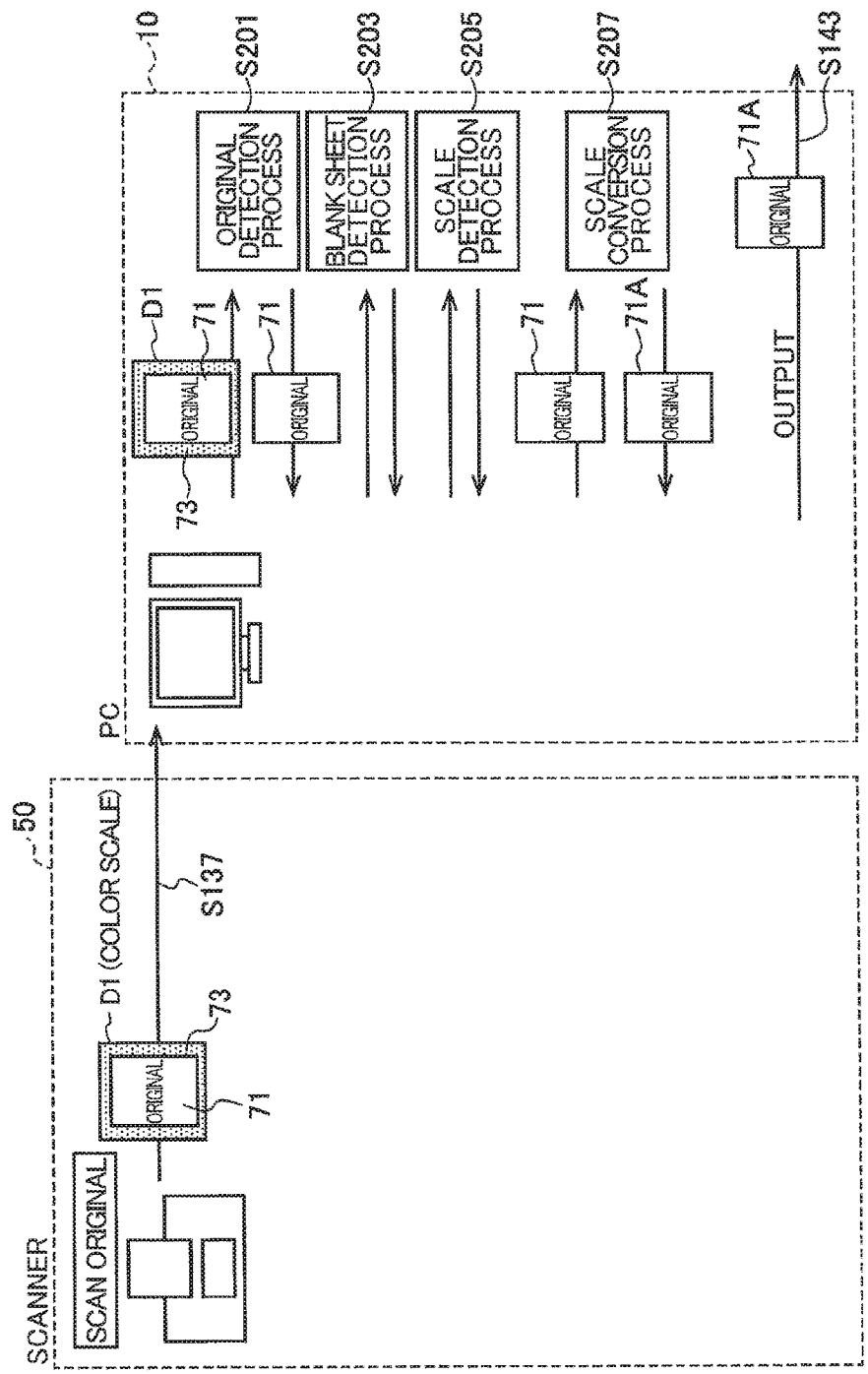
FIG. 5 is an explanation diagram illustrating processes of the scanning system when the PC executes the original detection process, a blank sheet detection process, a scale detection process, and a scale conversion process.

Specifically, as illustrated in FIG. 5, in S137 the scanner 50 generates the scan data D1 by adding the outer image data 73 to the original image data 71 and transmits the scan data D1 to the PC 10. In S201 the driver image process module 28E of the PC 10 executes the original detection process on the scan data D1 having the outer image data 73 added to the original image data 71 to extract the original image data 71. In S203 the driver image process module 28E executes the blank sheet detection process on the original image data 71 generated in S201. At this time, the driver image process module 28E detects that the original is a blank sheet when the entire original image data 71 represents white.

Next, the driver image process module 28E executes the scale detection process on the original image data 71 generated in S201. Specifically, in S205 the driver image process module 28E performs the scale detection process for detecting the number of colors included in the original image data 71 that was generated in S201. A well-known image processing method may be used as the method of detecting the number of colors. Subsequently, the driver image process module 28E determines a suitable color scale for the detected number of colors. That is, the suitable color scale is an optimized color scale suitable for the original image data 71. In the embodiment, the suitable color scale is one of a 24-bit color scale image, an 8-bit grayscale image, or a monochrome scale image. In other words, the suitable color scale is a minimal color scale that can represents an image of the original image data 71.

In S207 the scanner driver 28 converts the original image data 71 generated in S201 to the suitable color scale determined in S205. For example, when the driver image process module 28E detects in S205 that the suitable color scale of the original image data 71 is the monochrome scale, i.e., that the original image data 71 includes only white and black colors, in S207 the driver image process module 28E converts the color original image data 71 to monochrome original image data 71A. Through this process, the driver image process module 28E generates image data that reproduces the colors of the original. Note that an image processing method known in the art may be used as the method of converting the color scale.

In S143 of FIG. 3, the driver image process module 28E outputs the original image data 71A in the converted color scale to the driver main process module 28B. If the driver image process module 28E detects in S203 that the original is a blank sheet, the driver image process module 28E may notify the driver main process module 28B that a blank sheet was detected. Alternatively, the driver image process module 28E may simply not transmit original image data corresponding to the detected blank sheet when a blank sheet is detected in S203.

As described above, the blank sheet detection process and the scale detection process are both executed on the PC 10 when the original detection process is executed on the PC 10. When the scanning settings include a setting value specifying execution of the original detection process, the driver main process module 28B determines in S123 of FIG. 2 that the PC 10 will execute those processes corresponding to settings for the scanning parameters, regardless of whether the setting values specify execution of the blank sheet detection process and/or the scale detection process.

Thus, when the scanning setting values include a setting value specifying execution of the original detection process but includes neither a setting value specifying execution of the scale detection process nor a setting value specifying execution of the blank sheet detection process, the driver main process module 28B determines that the PC 10 will execute the original detection process as described above. If the scanning setting values include a setting value specifying execution of the original detection process and a setting value specifying execution of the scale detection process, the driver main process module 28B determines that the PC 10 will execute both the original detection process and the scale detection process. If the scanning setting values include a setting value specifying execution of the original detection process and a setting value specifying execution of the blank sheet detection process, the driver main process module 28B determines that the PC 10 will execute both the original detection process and the blank sheet detection process.

Note that when the scanning setting values include a setting value specifying execution of the original detection process and a setting value specifying execution of the scale detection process, the device main process module 65 of the scanner 50 generates the scan data D1 in the 24-bit color scale in order to facilitate the PC 10 in detecting the color scale appropriately in the scale detection process. However, when a setting value specifying execution of the scale detection process is not set, i.e., when the color scale is specified through a user operation, the device main process module 65 reads the image at the color scale specified by the user operation even if the setting value specifying execution of the original detection process is set. In other words, the setting value specifying execution of the scale detection process and the setting value specifying the color scale specified by the user are mutually exclusive.

Figure 6:
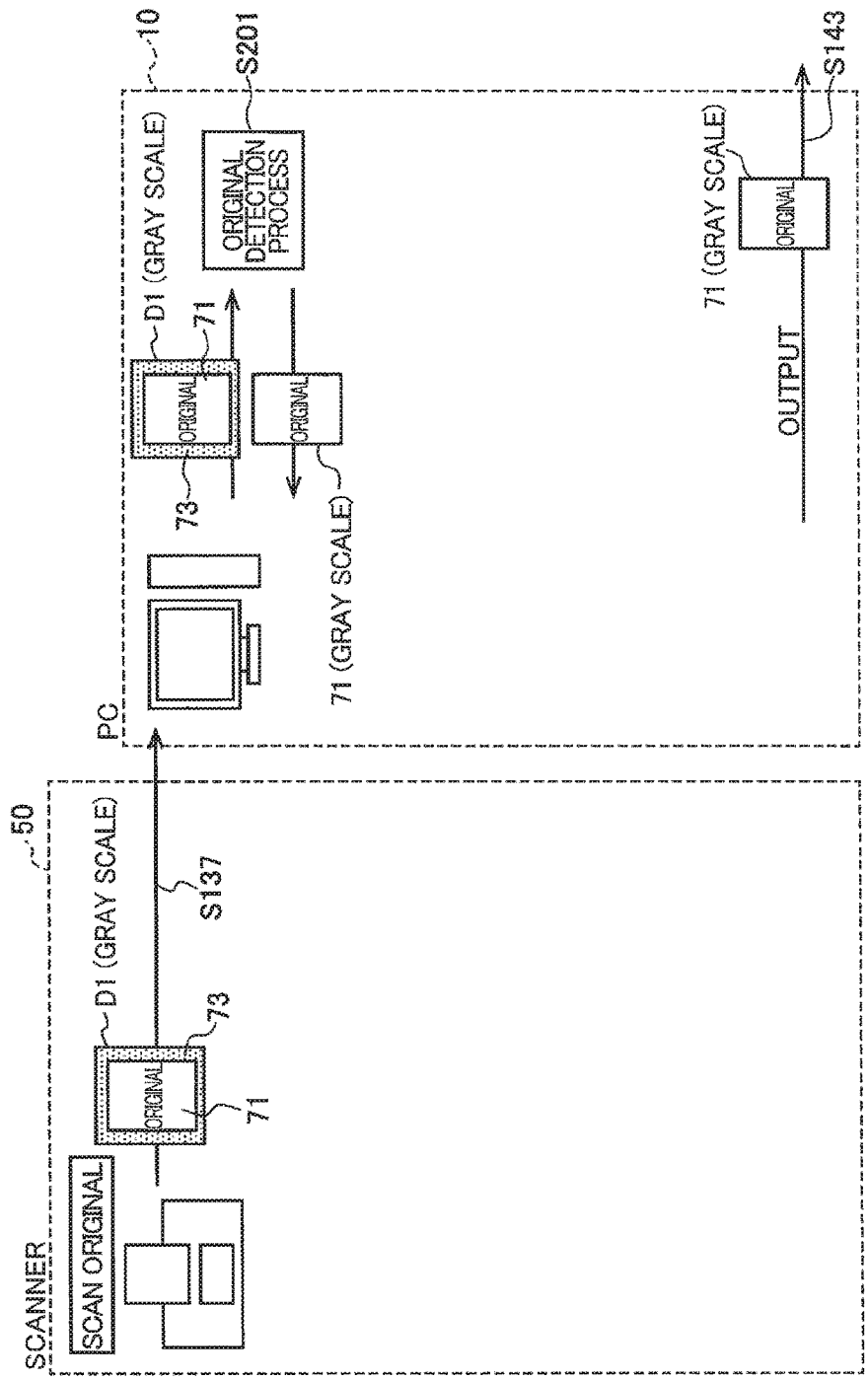
FIG. 6 is an explanation diagram illustrating processes of the scanning system when the PC executes the original detection process.

Specifically, when the user performs an operation specifying grayscale as the color scale, the device main process module 65 generates the scan data D in grayscale, as illustrated in FIG. 6. Next, the device main process module 65 transmits the grayscale scan data D1 to the PC 10. By generating the scan data D1 in grayscale in this way, the quantity of data that is transmitted is less than when the scan data D1 is in 24-bit color scale. Note that, when the color scale has been set to grayscale through a user operation, in S129 of FIG. 2 the driver main process module 28B of the PC 10 transmits a command to the device main process module 65 of the scanner 50 along with the scan start command, specifying that the original is to be read in grayscale. In this case, the driver main process module 28B does not transmit to the device main process module 65 instructions instructing execution of the original detection process because the original detection process is to be executed on the PC 10.

When the PC 10 receives the grayscale scan data D1, in S201 the driver image process module 28E of the PC 10 executes the original detection process on the grayscale scan data D1. Here, the original detection process can be properly executed, even when the scan data D1 is in grayscale, since the driver image process module 28E can recognize the outer image data 73 included in the scan data D1. Through this process, the driver image process module 28E suitably extracts the original image data 71 from the grayscale scan data D1 and outputs this original image data 71.

However, if the monochrome scale is specified as the color scale through user operations, and the device main process module 65 generates and transmits to the PC 10 monochrome scan data D1, the driver image process module 28E may not be able to execute the original detection process properly. That is, since the monochrome scan data D1 is configured only of the two colors of white and black, the driver image process module 28E cannot recognize gray as the color of the outer image data 73 based on the monochrome scan data D1.

Figure 7:
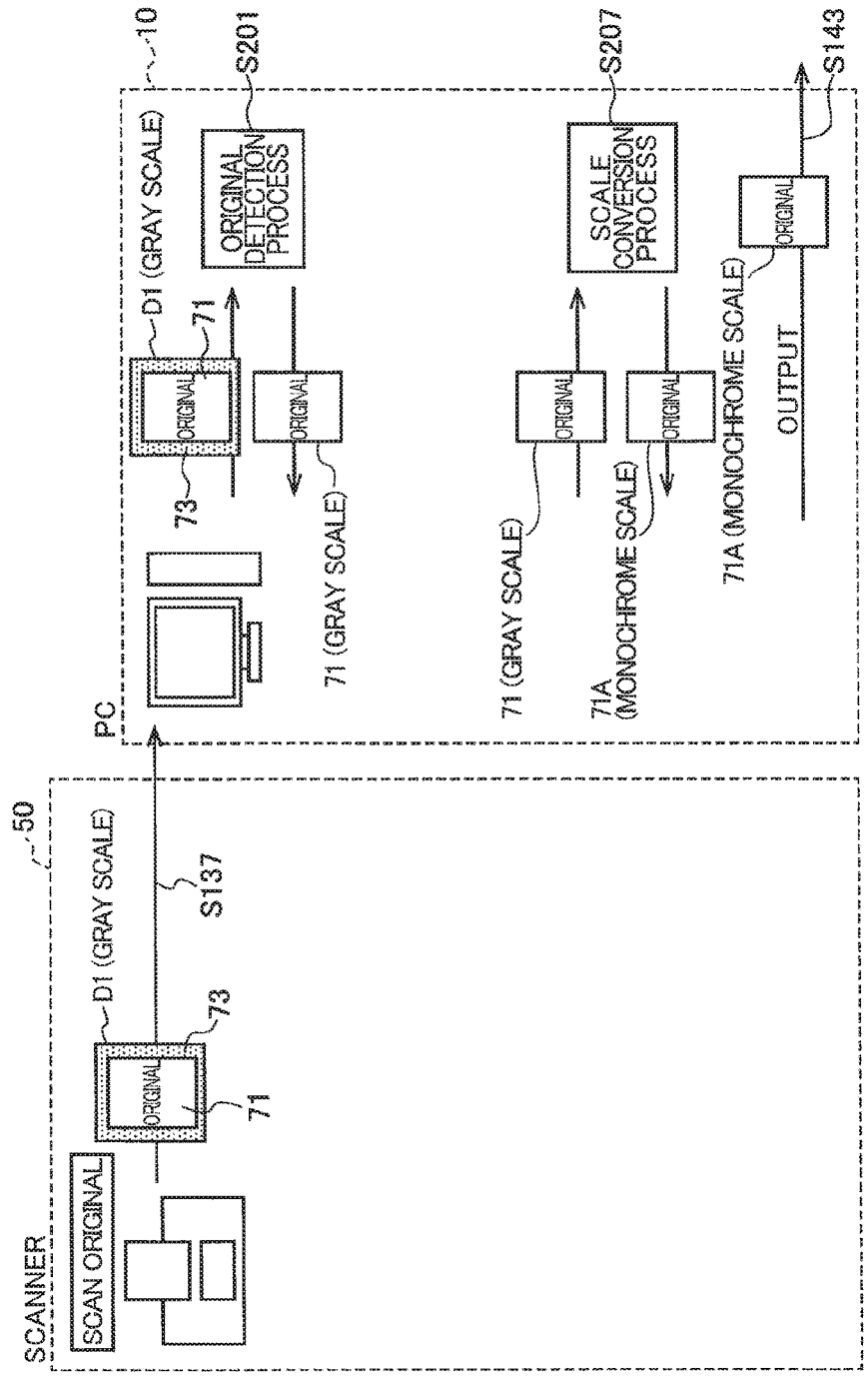
FIG. 7 is an explanation diagram illustrating processes of the scanning system when the PC executes the original detection process and the scale conversion process.

Therefore, when a setting value specifying execution of the original detection process is set and the color scale is specified as the monochrome scale through a user operation, the scanner 50 generates grayscale scan data D1, as illustrated in FIG. 7. In other words, rather than generating monochrome scan data D1 as specified by the user operation, the scanner 50 generates the grayscale scan data D1. Consequently, when a setting value specifying execution of the original detection process is set and the monochrome scale has been specified by a user operation to be the color scale, in S129 of FIG. 2 the driver main process module 28B of the PC 10 transmits a command specifying that the original is to be read in grayscale to the device main process module 65 of the scanner 50 together with the scan start command.

In S201 the driver image process module 28E executes the original detection process on the grayscale scan data D1 generated by the scanner 50. Here, the original detection process can be executed properly since the driver image process module 28E can recognize the outer image data 73 included in the scan data D1. Through this process, the device image process module 66 generates the original image data 71 by eliminating the outer image data 73 from the scan data D1. Here, the original image data 71 has been generated from grayscale scan data D1 and is therefore in grayscale. Hence, in S207 the driver image process module 28E executes a scale conversion process to convert the grayscale original image data 71 to monochrome original image data 71A, thereby generating the original image data 71A in the monochrome scale, that is, the color scale specified by the user. The driver image process module 28E then outputs this monochrome original image data 71A. That is, in a case where setting values include the setting value indicating the original detection process to be performed and the setting value indicating the monochrome color scale, the driver main process module 28B of the PC 10 determines that the scanner 50 will generate the A4-size scan data D1 in the grayscale for the original detection process. The driver main process module 28B transmits instructions to the device main process module 65 along with the scan start command in S129 instructing the reading interface 55 to read an A4-size image in grayscale. In S127 the driver main module 28B may modify the setting value indicating a monochrome scale set by the user to a setting value indicating the grayscale and transmits the modified setting value. In this case, the driver main process module 28B does not transmit to the device main process module 65 instructions instructing execution of the original detection process, because the original detection processes is to be executed on the PC 10. Because the scan data D1 is generated in the grayscale and the setting value specifies the monochrome scale, the driver main process module 28B transmits to the driver image process module 28E instructions instructing execution of the scale conversion process to convert the grayscale of the scan data to the monochrome scale.

As described above, the original detection process and the like are executed on the PC 10 when the scanning setting values include a setting value specifying execution of the original detection process. However, the size of the original to be read is specified through a user operation when the scanning setting values do not include a setting value specifying execution of the original detection process. In other words, the setting value specifying execution of the original detection process and the setting value specifying the size of the original specified by the user are mutually exclusive. Hence, when the size of the original is specified through a user operation, the scanner 50 may read an area corresponding to the specified original size, regardless of the actual size of original placed on the original platen. Accordingly, when the size of the original is specified through a user operation, the original detection process is omitted and the process for reading the area corresponding to the specified original size is executed on the scanner 50.

Figure 8:
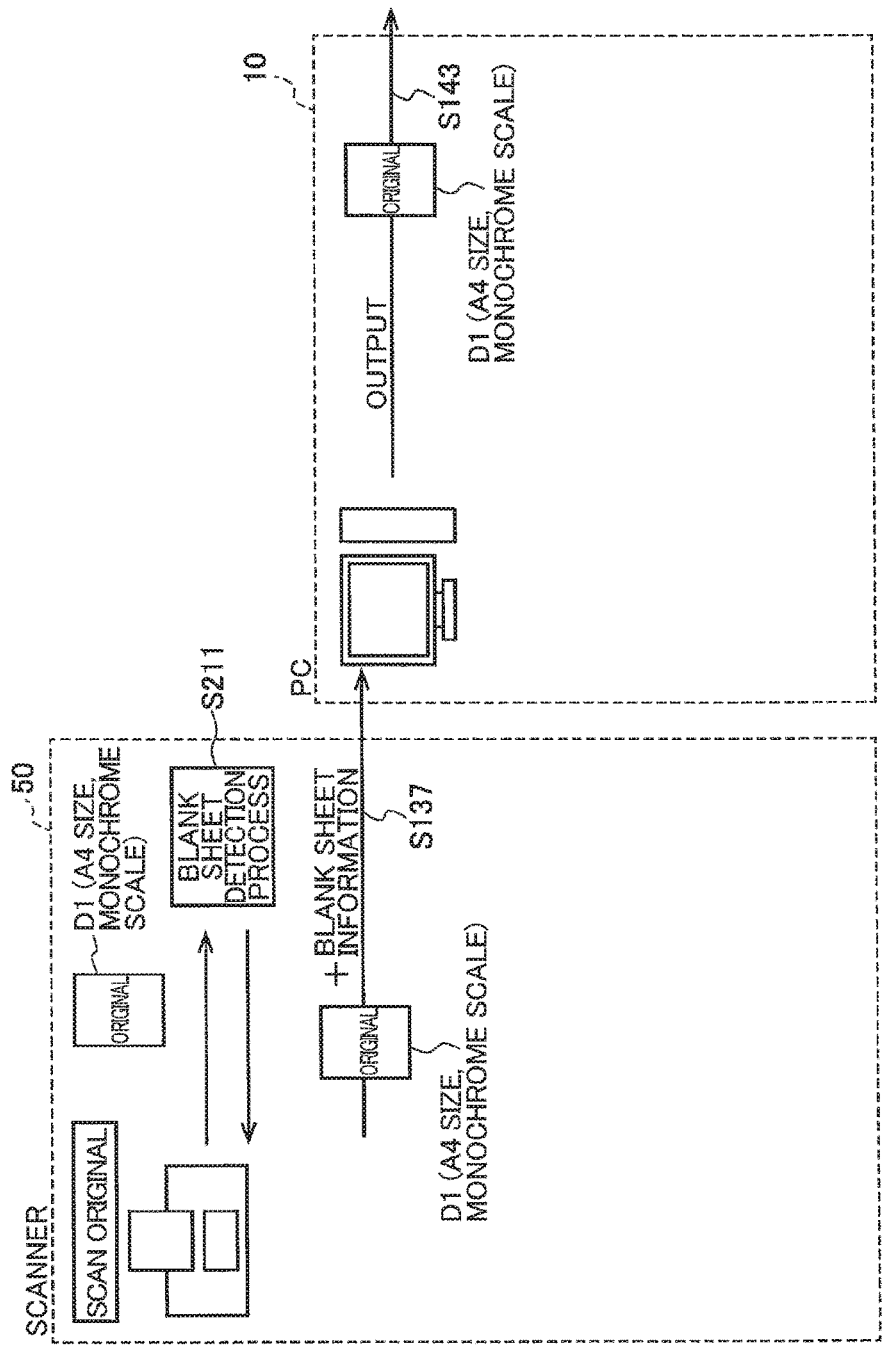
FIG. 8 is an explanation diagram illustrating processes of the scanning system when a scanner executes the blank sheet detection process.

As a specific example, as illustrated in FIG. 8, if the A4 size has been specified as the paper size of the original through a user operation, the device main process module 65 of the scanner 50 executes a process to read an area corresponding to the A4 size and to generate scan data D1 for the A4 size original. At this time, if a setting value specifying execution of the scale detection process has not been set, that is, if a setting value specifying the color scale is set by the user, the device main process module 65 generates scan data D1 in the color scale specified through a user operation, such as monochrome scan data D1. Therefore, in S129 of FIG. 2, the driver main process module 28B of the PC 10 transmits a command to the device main process module 65 of the scanner 50 together with a scan start command, specifying that an A4-size original is to be read in monochrome scale.

Note that when the paper size of the original is specified and execution of the blank sheet detection process is specified through a user operation, the scanner 50 executes the blank sheet detection process because the scanner 50 can execute this process more quickly than the PC 10. Hence, when a setting value specifying execution of the blank sheet detection process has been set, in S211 the device image process module 66 of the scanner 50 executes the blank sheet detection process. This process corresponds to S134 in FIG. 2. After the blank sheet detection process is executed, the device main process module 65 outputs the results of the process, and specifically information indicating whether the image based on the scan data D1 is a blank sheet, to the device image process module 66. Next, the device image process module 66 transmits the scan data D1 generated above to the PC 10 (S137 of FIG. 2). Specifically, if the results of the blank sheet detection process in S211 indicate that the image based on the scan data D1 is a blank sheet, the device image process module 66 transmits blank sheet information specifying that the image based on the scan data D1 is a blank sheet to the PC 10 together with the scan data D1. When the PC 10 receives the scan data D1, the driver main process module 28B of the PC 10 outputs this scan data D1 to the application program 26 (S151 of FIG. 3).

In this way, when the paper size of the original has been specified through a user operation, the reading process can be achieved more quickly by not executing the original detection process. Note that when the paper size of the original has been specified through a user operation, i.e., when a setting value specifying execution of the original detection process has not been set, in the determination process of S123 in FIG. 2 for determining whether the scanner 50 will execute the blank sheet detection process, the driver main process module 28B determines that the scanner 50 will execute the blank sheet detection process when the scanning values do not include a setting value specifying execution of the original detection process, but include a setting value specifying execution of the blank sheet detection process. That is, in a case where setting values includes the setting value specifying execution of the blank sheet detection process, the setting value specifying the A4 size of the original specified by the user (that is, the setting value not specifying the execution of the original detection process), and the setting value specifying the monochrome color scale (that is, the setting value not specifying execution of the scale detection process), the device main module 28B determines that the scanner 50 will generate the A4-size scan data in the monochrome scale which the user has specified, and that the scanner 50 will execute the blank sheet detection process. Thus, the device main module 28B transmits instructions instructing that the scanner 50 generates the scan data D1 of the A4 size in the monochrome scale and performs the blank sheet detection process on the scan data D1.

Further, when the scanning values do not include a setting value specifying execution of the original detection process and do not include a setting value specifying execution of the scale detection process, the scanner 50 generates the scan data D1 in the color scale specified through a user operation, as described above. However, if the scanning values do not include a setting value specifying execution of the original detection process but do include a setting value specifying execution of the scale detection process, the scanner 50 generates color scan data D1. A specific example is described below for the case in which a setting value specifying execution of the original detection process has not been set, the A4 size has been specified as the original size through a user operation, and a setting value specifying execution of the scale detection process has been set.

Figure 9:
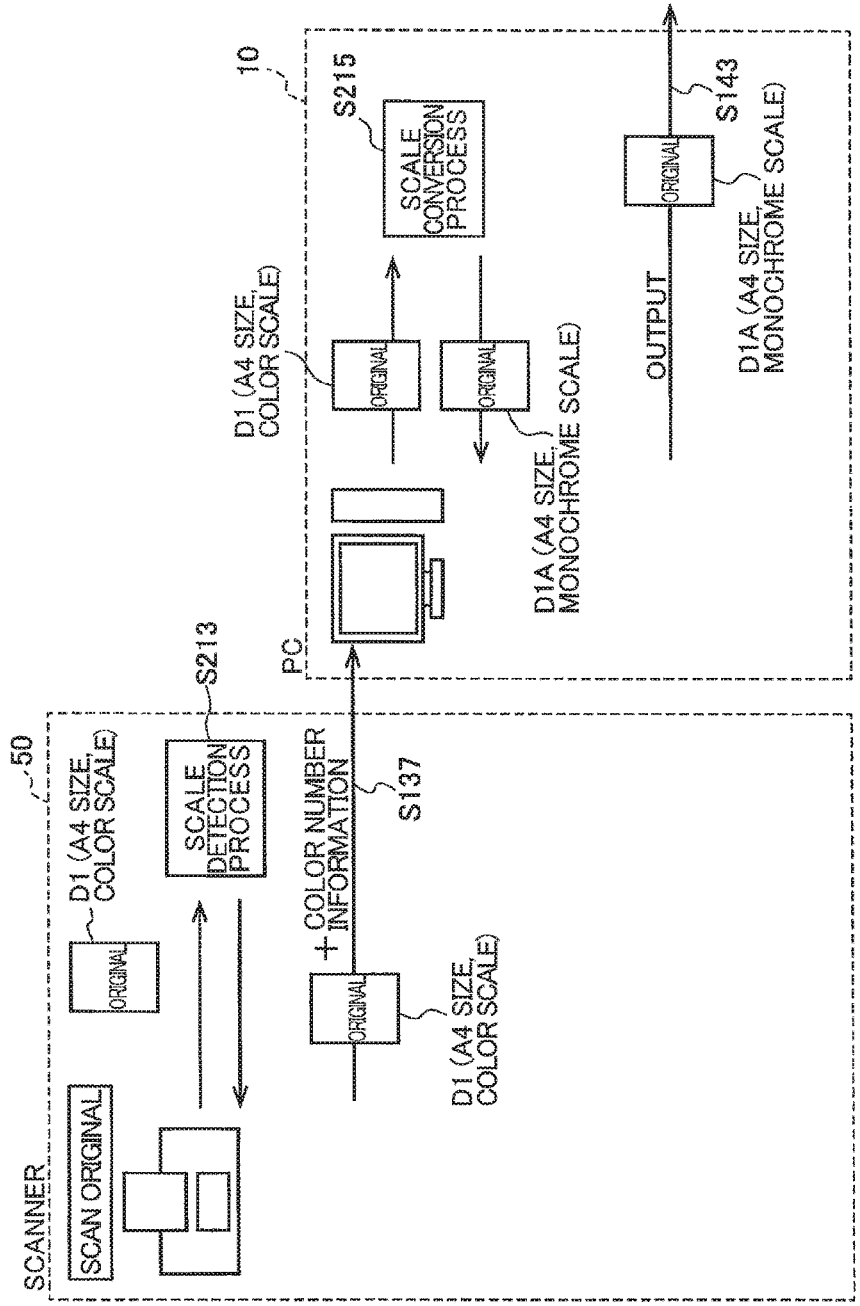
FIG. 9 is an explanation diagram illustrating processes of the scanning system when the scanner executes the scale detection process.

When the A4 size has been specified through a user operation and a setting value specifying execution of the scale detection process has been set, as illustrated in FIG. 9 the device main process module 65 of the scanner 50 executes a reading process in color for an area corresponding to the A4 size and generates color scan data D1 for the A4-size original. Hence, in S129 of FIG. 2, the driver main process module 28B of the PC 10 transmits a command to the device main process module 65 of the scanner 50 together with the scan start command, specifying that an A4 size original is to be read in 24-bit color scale.

After generating the scan data D1, the device main process module 65 outputs this scan data D1 to the device image process module 66, and the device image process module 66 executes the scale detection process because the scanner 50 can execute the scale detection process quicker than the PC 10. This process corresponds to S134 in FIG. 2. In S213 the device image process module 66 detects the number of colors in the scan data D1 generated by the device image process module 66 as the scale detection process. Next, the device image process module 66 outputs color number information related to the number of detected colors to the device main process module 65, and the device main process module 65 transmits this color information to the PC 10 together with the scan data D1 generated above (S137 of FIG. 2).

In response to receiving the scan data D1, in S215 the PC 10 converts the color scale of the scan data received from the device main process module 65 on the basis of the color information received with the scan data D1. Thus, the color number detection process in the scale detection process is executed on the scanner 50, while the scale conversion process is executed on the PC 10. This configuration is used because the scanner 50 transmits scan data to the PC 10 line-by-line, after each line is scanned. Accordingly, all of the scan data D1 will have been transmitted to the PC 10 after completing the process of detecting the number of color components in the scan data D1. However, in a case where the scanner 50 reads one complete sheet worth of the original before transmitting scan data D1 for that sheet to the PC 10, the scale conversion process may also be executed on the scanner 50.

Note that when the scale conversion process is executed on the PC 10, in S215 the driver image process module 28E converts the color scale of the scan data to the suitable color scale based on the color information received with the scan data D1. Hence, if the color information specifies two colors, the driver image process module 28E converts the color scan data D1 to monochrome scan data D1A. Subsequently, the driver image process module 28E outputs the monochrome scan data D1A to the driver main process module 28B, and the driver main process module 28B outputs the monochrome scan data D1A to the application program 26 (S151 of FIG. 3).

Note that when the paper size of the original has been specified through a user operation, a setting value specifying execution of the original detection process has not been set. When the paper size of the original has been specified through a user operation, and when the setting value specifying execution of the scale detection process, the driver main process module 28B determines that the scanner 50 will execute the scale detection process (S123). That is, in a case where setting values includes the setting value specifying the scale detection process to be performed and the setting value specifying the A4 size of the original specified by the user, the driver main process module 28B of the PC 10 determines that the scanner 50 will generate the A4 size scan data D1 in the 24-bit color scale for the scale detection process, and that the scanner 50 will perform the scale detection process and the PC 10 will perform the scale conversion process. So, the driver main process module 28B transmits instructions to the device main process module 65 along with the scan start command in S129 instructing the reading interface 55 to read an A4-size image in 24-bit color scale, and instructions instructing execution of the scale detection process, but does not transmit instructions instructing execution of the scale conversion process because the scale conversion process is to be executed on the PC 10. Because the scan data D1 is generated in the 24-bit color scale for the scale detection process, the driver main process module 28B transmits to the driver image process module 28E instructions instructing execution of the scale conversion process to convert the grayscale of the scan data to a color scale based on the color information.

The CPU 12 that executes S121 is an example of the receiving an input operation. The CPU 12 that executes S123 is an example of the determining. The CPU 12 that executes S129 is an example of the transmitting. The CPU 12 that executes S134 is an example of the performing the second image process. The CPU 12 that executes S137 is an example of the outputting the first scan data, the outputting information generated in the second image process, the receiving the first scan data, the receiving information generated in the second image process, and the executing the first image process and the second image process.

Effects of the Embodiment

The embodiment described above has the following effects.

When the driver main process module 28B determines that both a first image process (the original detection process) and a second image process (the scale detection process, or the blank sheet detection process) are to be executed, the driver main process module 28B controls the PC 10 to execute the first image process on the scan data D1 and controls the PC 10 to execute the second image process on the original image data 71 generated in the first image process. The first image process is performed to generate original image data 71 from the target scan data D1 through image processing. In this way, the PC 10 can execute both the first image process and the second image process suitably.

More precise results can be achieved when the second image process is executed on the original image data 71 generated through the first image process rather than when the second image process is executed on the scan data D1. Consequently, the second image process can be performed more precisely.

When the driver main process module 28B determines that both the first image process and the second image process are to be executed, the scanner 50 generates the scan data D1 including original image data 71, which is generated by the optical reading of the original, and the outer image data 73, which is generated by the optical reading outside the outer edge of the original. The first image process generates image data that includes the original image data 71 but does not include the outer image data 73. In this way, a process for detecting the size of the original can be executed suitably as the first image process.

The second image process includes a process for detecting the color scale of the original image data based on original image data 71 acquired through the first image process. When the driver main process module 28B determines that both the first image process and the second image process are to be executed, the driver main process module 28B controls the PC 10 to execute the first image process on the scan data D1 and controls the PC 10 to execute the second image process on the image data that is generated through the first image process and includes the original image data 71 but does not include the outer image data 73. When the driver main process module 28B determines that the first image process is not to be executed but that the second image process is to be executed, the scanner 50 generates the scan data D1 including the original image data 71 but does not include the outer image data 73, and the driver main process module 28B controls the scanner 50 to execute the second image process on the scan data D1. With this process, the color scale can be suitably detected.

The scan data D1 is scan data represented by a color scale having a first number of colors (24-bit color scale or 8-bit color scale). The second image process includes a process for converting original image data acquired through the first image process to scan data in a color scale having a second number of colors (8-bit color scale or monochrome color scale) fewer than the first number when the number of colors in the color scale detected through the second image process is less than or equal to the second number. In this way, the quantity of the image data can be reduced.

The driver user interface module 28D accepts various setting values for the first image process and the second image process via the input interface 18 as the operation input. The setting value for the first image process indicates whether the original size is to be specified through a user operation or to be detected automatically. The driver main process module 28B determines that the first image process is to be executed when the setting value for the first image process indicates that the original size is to be detected automatically. The setting value for the second image process indicates whether one of a plurality of color scales is to be specified through a user operation or to be detected automatically. The driver main process module 28B determines that the second image process is to be executed when the setting value for the second image process indicates that the color scale is to be detected automatically. With this configuration, a process for automatically detecting the original size and a process for automatically detecting the color scale from a plurality of color scales can be performed suitably.

The second image process serves to determine, on the basis of the original image data 71 acquired through the first image process, whether the original image data 71 is scan data based on (or representing) a blank original. When the driver main process module 28B determines that both the first image process and the second image process are to be executed, the driver image process module 28E controls the PC 10 to execute the first image process on the scan data D1 and controls the PC 10 to execute the second image process on the image data that includes the original image data 71 generated through the first image process but does not include the outer image data 73. When the driver main process module 28B determines that the first image process is not to be executed but that the second image process is to be executed, the scanner 50 generates the scan data D1 including the original image data 71 but not including the outer image data 73, and the device image process module 66 controls the scanner 50 to execute the second image process on the scan data D1. Through this process, a blank original can be detected suitably.

The PC 10 has the memory 14 that stores the scanner driver 28 for the scanner, and the application program 26 for outputting a scan command to the scanner driver. The scanner driver 28 acquires through execution of the second image process information that indicates whether the original image data 71 is scan data based on a blank original, and outputs this information to the application program 26. In this way, information related to blank originals can be used in the application program 26.

The driver user interface module 28D accepts various setting values for the first image process and the second image process via the input interface 18 as the operation input. The setting value for the first image process indicates whether the original size is to be specified through a user operation or to be detected automatically. When the setting value for the first image process indicates that the size of the original is to be detected automatically, the scanner 50 generates the scan data D1 including both original image data 71 generated by the optical reading of the original and outer image data 73 generated by the optical reading outside the outer edge of the original. When the setting value for the first image process indicates that the original size is to be specified through a user operation, the scanner 50 generates the scan data D1 which does not include the outer image data but includes the original image data. In this way, the process for detecting the size of the original automatically can be performed suitably.

While the disclosure has been described in detail with reference to specific embodiment thereof, it would be apparent to those skilled in the art that many modifications and variations may be made therein without departing from the scope of the disclosure, which is defined by the attached claims. For example, in the embodiment described above the PC 10 determines whether the PC 10 or the scanner 50 will execute various processes, such as the original detection process, but this determination may be made on the scanner 50 instead.

Further, the embodiment describes a case in which the CPUs 12 and 52 executes the processes shown in FIGS. 2 through 9, but these processes may be executed using an ASIC or other logic integrated circuit rather than the CPUs 12 and 52 or may be executed through a combination of CPUs, ASICs, and other logic integrated circuits.

What is claimed is:

1. A scanning system comprising:
    a scanner configured to generate scan data based on an original through an optical reading;
    an information processing apparatus;
    a user interface; and
    a processor configured to perform:
        receiving an input via the user interface;
        determining, on the basis of the input, each of a plurality of image processes to be performed on the scan data or data based on the scan data, the plurality of image processes including a first image process and a second image process;
        in a first case where both the first image process and the second image process are determined to be performed, instructing the scanner to output the scan data to the information processing apparatus, and instructing the information processing apparatus to perform both the first image process and the second image process; and
        in a second case where the first image process is determined not to be performed and the second image process is determined to be performed, instructing the scanner to perform the second image process on the scan data to generate information, and instructing the scanner to output the generated information to the information processing apparatus.

2. The scanning system according to claim 1, wherein in the first case, the processor is configured to perform instructing the information processing apparatus to perform the first image process on the scan data to generate image data from the scan data, and instructing the information processing apparatus to perform the second image process on the generated image data.

3. The scanning system according to claim 2, wherein in a case where the image data is subject to the second image process, a more precise result of the second image process is achieved compared with a case where the scan data is subject to the second image process.

4. The scanning system according to claim 2, wherein in the first case, the processor is configured to perform instructing the scanner to generate the scan data including original image data by optically reading the original and outer image data by optically reading an area outside the original,
    wherein the image data generated in the first image process includes the original image data, but does not include the outer image data.

5. The scanning system according to claim 4, wherein the second image process includes a scale detection process for acquiring the information indicating a target color scale based on number of colors used in the original image data,
    wherein in the first case, the processor is configured to perform instructing the information processing apparatus to perform the first image process on the scan data, and instructing the information processing apparatus to perform the second image process on the image data including the original image data but not including the outer image data,
    wherein in the second case, the processor is configured to perform instructing the scanner to generate the scan data including the original image data but not including the outer image data, and instructing the scanner to perform the second image process on the scan data including the original image data but not including the outer image data.

6. The scanning system according to claim 5, wherein the scan data is in a form of a first color scale capable of representing a first number of colors,
    wherein the target color scale is capable of representing a second number of colors,
    wherein in a case where the second number of colors is smaller than the first number of colors, the second image process converts the original image data to second image data in a form of the target color scale.

7. The scanning system according to claim 5, wherein the processor is configured to further perform receiving a first setting value and a second setting value respectively for the first image process and the second image process through a user operation via user interface,
    where the first setting value indicates either one of information specifying a size of the original designated by the user operation and information specifying that the size of the original is to be automatically detected,
    wherein in a case where the first setting value indicates information specifying that the size of the original is to be automatically detected, the processor determines the first image process to be performed,
    wherein the second setting value indicates either one of information specifying one of a plurality of color scales designated by the user operation and information specifying that the target color scale is to be automatically determined from among the plurality of color scales,
    wherein in a case where the second setting value indicates the information specifying that a color scale is to be automatically determined, the processor determines the second image process to be performed.

8. The scanning system according to claim 4, wherein the second image process determines whether the original image data is generated by optically reading a blank sheet as the original,
    wherein in the first case, the processor is configured to perform instructing the information processing apparatus to perform the first image process on the scan data, and instructing the information processing apparatus to perform the second image process on the image data including the original image data but not including the outer image data,
    wherein in the second case, the processor is configured to perform instructing the scanner to generate the scan data including the original image data but not including the outer image data, and to perform the second image process on the scan data including the original image data but not including the outer image data.

9. The scanning system according to claim 8, wherein the information processing apparatus includes a storage storing a scanner control program of the scanner, and a program outputting a scan command for execution of the scanner control program, the scanner control program and the program being executed by the processor,
  wherein in a case where the second image process determines that the original image data is generated by optically reading the blank sheet as the original, the processor executing the scanner control program is configured to perform:
  acquiring blank sheet information indicating that the original image data is generated by optically reading the blank sheet as the original; and
  outputting the blank sheet information from the scanner control program to the program.

10. The scanning system according to claim 1, wherein the processor is configured to further perform receive a setting value for the first image process through a user operation via user interface,
  wherein the setting value indicates one of information specifying a size of the original designated by the user operation and information specifying that the size of the original is to be automatically detected,
  wherein in a case where the setting value indicates information specifying that the size of the original is to be automatically detected, the processor is configured to perform instructing the scanner to generate the scan data including original image data by optically reading the original and outer image data by optically reading an area outside the original,
  wherein in a case where the setting value indicates information specifying a size of the original designated by the user operation, the processor is configured to perform instructing the scanner to generate the scan data including the original image data but not including the outer image data.

11. An information processing apparatus comprising:
  a communication interface configured to communicate with a scanner,
  a user interface;
  a processor configured to perform:
    receiving an input via the user interface;
    determining, on the basis of the input, each of a plurality of image processes to be performed on scan data or data based on the scan data, the plurality of image processes including a first image process and a second image process;
    in a first case where both the first image process and the second image process are determined to be performed, instructing the scanner to output the scan data to the information processing apparatus, and instructing the information processing apparatus to perform both the first image process and the second image process; and
    in a second case where the first image process is determined not to be performed and the second image process is determined to be performed, instructing the scanner to perform the second image process on the scan data to generate information, and instructing the scanner to output the generated information to the information processing apparatus.

12. A non-transitory computer readable storage medium storing a scanner control program having a set of program instructions installed on and executed by a processor of an information processing apparatus for controlling a scanner, the information processing apparatus having a communication interface configured to communicate with the scanner, a user interface and the processor, the set of program instructions, when executed by the processor, causes the information processing apparatus to perform:
  receiving an input via the user interface;
  determining, on the basis of the input, each of a plurality of image processes to be performed on scan data or data based on the scan data, the plurality of image processes including a first image process and a second image process;
  in a first case where both the first image process and the second image process are determined to be performed, instructing the scanner to output the scan data to the information processing apparatus, and instructing the information processing apparatus to perform both the first image process and the second image process; and
  in a second case where the first image process is determined not to be performed and the second image process is determined to be performed, instructing the scanner to perform the second image process on the scan data to generate information, and instructing the scanner to output the generated information to the information processing apparatus.

* * * * *